(12) United States Patent
Testa et al.

(10) Patent No.: US 10,367,598 B2
(45) Date of Patent: Jul. 30, 2019

(54) DEVICE, SYSTEM AND METHOD FOR PROCESSING AN OPTICAL SIGNAL

(71) Applicant: Telefonaktiebolaget LM Ericsson (publ), Stockholm (SE)

(72) Inventors: Francesco Testa, Pisa (IT); Marco Romagnoli, Pisa (IT); Vito Sorianello, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/760,831

(22) PCT Filed: Sep. 25, 2015

(86) PCT No.: PCT/EP2015/072153
§ 371 (c)(1),
(2) Date: Mar. 16, 2018

(87) PCT Pub. No.: WO2017/050393
PCT Pub. Date: Mar. 30, 2017

(65) Prior Publication Data
US 2018/0316458 A1    Nov. 1, 2018

(51) Int. Cl.
*H04J 14/06* (2006.01)
*H04B 10/25* (2013.01)
(Continued)

(52) U.S. Cl.
CPC .............. *H04J 14/06* (2013.01); *H04B 10/25* (2013.01); *H04B 10/548* (2013.01); *H04J 14/02* (2013.01)

(58) Field of Classification Search
CPC ....... H04B 10/25; H04B 10/548; H04J 14/02; H04J 14/06

(Continued)

(56) References Cited

U.S. PATENT DOCUMENTS

| 9,835,800 | B2* | 12/2017 | Mansouri Rad | ..... G02B 6/2773 |
| 2011/0293275 | A1* | 12/2011 | Evans | ................ H04B 10/2572 398/65 |
| 2015/0117872 | A1* | 4/2015 | Lyubomirsky | .......... H04J 14/06 398/205 |

FOREIGN PATENT DOCUMENTS

EP    1164724 A2    12/2001

OTHER PUBLICATIONS

Sabella, R. et al., "Trends in Optical Transport Networks and Related Technologies", 16th International Conference on Transparent Optical Networks (ICTON), Jul. 6-10, 2014, pp. 1-4, Graz, Austria.

(Continued)

*Primary Examiner* — Dalzid E Singh
(74) *Attorney, Agent, or Firm* — Sage Patent Group

(57) ABSTRACT

A device (100) for processing a signal, the device comprising a polarization module (102) configured to receive a multi-wavelength optical input signal (Si) comprising a plurality of wavelengths, and for each wavelength. The polarization module is configured to convert a component of each wavelength having a first polarization mode into a converted component having a second, different, polarization mode. The device further comprises a processing module (104,106,114,128) configured to combine the converted component of each wavelength with a direct component of each wavelength received with said second polarization mode. The processing module is configured to generate a multi-wavelength optical output signal (So) solely having said second polarization mode.

16 Claims, 10 Drawing Sheets

(51) Int. Cl.
  *H04B 10/548* (2013.01)
  *H04J 14/02* (2006.01)
(58) Field of Classification Search
  USPC .......................................................... 398/65
  See application file for complete search history.

(56) References Cited

OTHER PUBLICATIONS

Caspers, J. et al., "Active polarization independent coupling to silicon photonics circuit", Silicon Photonics and Photonic Integrated Circuits IV, May 1, 2014, pp. 1-11.
Sacher, W. et al., "Polarization rotator-splitters and controllers in a Si3N4-on-SOI integrated photonics platform", Optics Express, May 5, 2014, pp. 11167-11174, vol. 22, No. 9.
Ten, S. et al., "An Introduction to the Fundamentals of PMD in Fibers", Corning, Jul. 2006, pp. 1-12.
Steinkamp, A. et al., "Polarization mode dispersion and polarization dependent loss in optical fiber systems", Optical Transmission Systems and Equipment for WDM Networking III, Oct. 25, 2004, pp. 1-12.
Giorgi, L. et al., "Remote light source for silicon photonic transceivers in mobile fronthaul applications", Electronic Letters, Feb. 19, 2015, pp. 355-357, vol. 51, No. 4.
Li, C. et al., "Silicon polarization independent microring resonator-based optical tunable filter circuit with fiber assembly", Optics Express, Aug. 1, 2011, pp. 15429-15437, vol. 19, No. 16.

\* cited by examiner

DEVICE, SYSTEM AND METHOD FOR PROCESSING AN OPTICAL SIGNAL

TECHNICAL FIELD

The disclosure relates to a device, method and system for processing an optical signal.

BACKGROUND

Integrated semiconductor photonic circuits are used as parallel optical transceivers for high speed optical interconnect, and there is now the possibility to scale the capacity of the optical interconnect to 100 Gbps and beyond. The reach of such an interconnect may be up to a few tens of kilometers. The integration level of photonic circuits may be scaled by introducing many optical processing circuits onto a small chip of a few square millimetres in size, for example for use in emerging optical transport applications for mobile fronthaul and back-haul networks and for use in optical circuit switching for data centres. These circuits may use complementary metal-oxide-semiconductor (CMOS) technology photonics.

These applications may utilise multi-wavelength technology, and wavelength division multiplexing (WDM) is often exploited to reduce the size of the chips housing such integrated semiconductor photonic circuits and to also reduce the number of input/output ports required on these chips.

The transmission of high speed WDM signals among semiconductor photonic chips interconnected in an optical network may require the semiconductor photonic circuits to be interfaced with standard single mode fibers (SMFs). The length of a section of SMF could be between 100 m to 10 Km.

Transmission of optical signals through an SMF makes those optical signals vulnerable to polarization mode dispersion (PMD). PMD is a random phenomenon which is caused by randomly varying birefringence of the SMF, which causes changes in the polarization modes of the optical signal being transmitted. This causes interfacing issues at the semiconductor photonic circuits. Existing solutions may utilise polarization diversity structures placed at the input of the semiconductor photonic chips, for example as described by Chao Li, Jing Zhang, Jeong Hwan Song, Huijuan Zhang, Shiyi Chen, Mingbin Yu and G.Q Lo "Semiconductor Polarization Diversity Optical Tunable Filter Circuits with Fiber Assembly" Proceedings of 2011 IEEE Micro-Wave Photonics. This solution results in increased chip area, increased complexity, higher losses and/or higher manufacturing and implementation cost.

Aspects and embodiments were conceived with the foregoing in mind.

SUMMARY

A first aspect provides a device for processing a signal, the device comprising a polarization module configured to receive a multi-wavelength optical input signal comprising a plurality of wavelengths, and for each wavelength. The polarization module is configured to convert a component of each wavelength having a first polarization mode into a converted component having a second, different, polarization mode. The device further comprises a processing module configured to combine the converted component of each wavelength with a direct component of each wavelength received with said second polarization mode. The processing module is configured to generate a multi-wavelength optical output signal solely having said second polarization mode.

Thus, a multi-wavelength (WDM) optical signal having an arbitrary combination of first and second polarization modes is processed into a single output of only one of the polarization modes.

Optionally, the processing module comprises a first optical phase shift module configured to apply a first phase shift to each wavelength of the converted component and/or direct component received from the polarization module. The processing module further comprises a first optical coupler configured to receive the converted component and direct component, at least one of the converted component and direct component being phase shifted by the first phase shift. The first optical phase shift module is configured to apply the first phase shift such that the first optical coupler outputs a first and second optical signal of substantially equal power.

Optionally, the processing module comprises a second optical phase shift module configured to apply a second phase shift to each wavelength of the first and/or second optical signal received from the first optical coupler. The processing module further comprises a second optical coupler configured to receive the first and/or second optical signal, at least one of the first and/or second optical signal being phase shifted by the second phase shift. The second optical phase shift module is configured to apply the phase shift such that the coupler outputs a combined multi-wavelength optical signal solely having said second polarization mode.

In a second aspect, an optical communication system comprises a transmitter and a receiver. The transmitter is configured to transmit a multi-wavelength optical signal comprising a plurality of wavelengths along an optical fiber. The receiver comprises a device for processing a signal. The device comprises a polarization module configured to receive the multi-wavelength optical signal comprising the plurality of wavelengths, and for each wavelength, the polarization module is configured to convert a component of each wavelength having a first polarization mode into a converted component having a second, different, polarization mode. The device further comprises a processing module configured to combine the converted component of each wavelength with a direct component of each wavelength received with said second polarization mode, wherein the processing module is configured to generate a multi-wavelength optical output signal solely having said second polarization mode.

Optionally, the transmitter is configured to transmit wavelengths which are selected to be within a determined bandwidth, wherein the bandwidth is determined such that the polarization modes of the wavelengths within the bandwidth have a variation which is substantially uniform among the wavelengths.

Optionally, the determined bandwidth is defined by:

$$\Delta\lambda = 1/\langle\Delta_T\rangle$$

where $\Delta\lambda$ is the determined bandwidth in units of nanometers, and $\langle\Delta_T\rangle$ is the average differential group delay in units of picoseconds, ps, and optionally, where $$\langle\Delta_T\rangle = \text{PMD coeff.} \times L^{1/2}$$

where PMD coeff. is a coefficient indicating the phase modulation dispersion of the fiber in units of ps/km$^{1/2}$, and L is the length of the fiber between the transmitter and receiver in units of kilometers.

In a third aspect, a method for processing a signal comprises receiving a multi-wavelength optical input signal comprising a plurality of wavelengths, and for each wavelength, converting a component of each wavelength having a first polarization mode into a converted component having a second, different, polarization mode. The method further comprising combining the converted component of each wavelength with a direct component of each wavelength received with said second polarization mode. The method further comprising generating a multi-wavelength optical output signal solely having said second polarization mode.

In a fourth aspect, an optical communication method comprises transmitting a multi-wavelength optical signal comprising a plurality of wavelengths along an optical fiber, and receiving the multi-wavelength optical signal comprising the plurality of wavelengths, and for each wavelength, converting a component of each wavelength having a first polarization mode into a converted component having a second, different, polarization mode. The method further comprises combining the converted component of each wavelength with a direct component of each wavelength received with said second polarization mode, and generating a multi-wavelength optical output signal solely having said second polarization mode.

BRIEF DESCRIPTION OF THE DRAWINGS

Embodiments of the disclosure will now be described, by way of example only, with reference to the figures, in which.

DETAILED DESCRIPTION

Figure 1A:
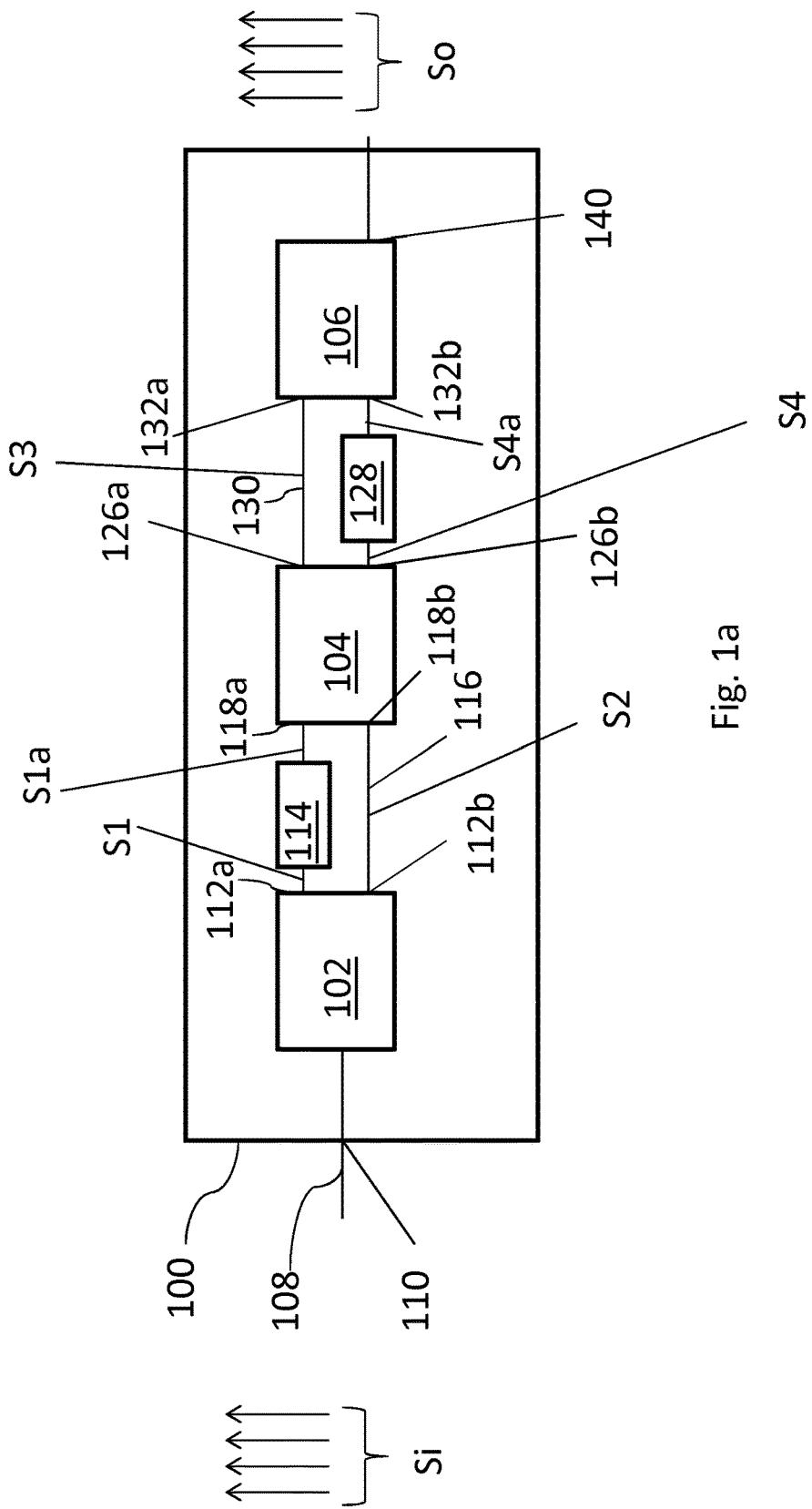
FIG. 1a schematically illustrates a device in accordance with the embodiment.

We now describe a device 100 in accordance with a first embodiment with reference to FIG. 1a.

Device 100 may be, or form part of, a semiconductor photonics circuit. The device 100 may be implemented as a single integrated photonics device or circuit, so as to avoid the risk of polarization changes by optical fiber interconnects. Device 100 comprises a polarization handling block 102, a first optical coupler 104 and a second optical coupler 106. Polarization handling block 102 is arranged to be coupled to a section of single mode optical fiber 108 through a first input port 110. The polarization handling block 102 comprises a first output port 112a and a second 112b output port. The first output port 112a is coupled to a first optical phase shifter 114. The first optical phase shifter 114 is coupled to a first input port 118a of the first optical coupler 104. The second output port 112b is coupled to a first inner section of optical waveguide 116. Thus, the second output port 112b is directly coupled to a second input port 118b of the first optical coupler 104.

The first optical coupler 104 has a first output port 126a and a second output port 126b. The first output port 126a is coupled to a second inner section of optical waveguide 130. Thus, the first output port 126a is directly coupled to a first input port 132a of the second optical coupler 106. The second output port 126b is coupled to a second optical phase shifter 128. The second optical phase shifter 128 is coupled to a second input port 132b of the second optical coupler 106.

The second optical coupler 106 has a single output 140 for the processed signal.

The polarization handling block 102, alternatively termed a polarization module, may be considered as generally receiving wavelengths having a first polarization mode (TM) and a different, second, polarization mode (TE). The polarization handling block 102 is configured to convert a component of the first polarization mode (TM) into a component of the different, second, polarization mode (TE). This changed signal for each wavelength may be referred to as a converted signal. The polarization handling block is further configured to output the received component of the second polarization mode without polarization mode conversion, i.e. as a direct signal. The converted signal and direct signal are output from separate outputs of the polarization handling block 102.

The first and second optical phase shifters 114,128 and first and second optical couplers 104,106 may be considered as a processing module. As described below, the processing module is configured to receive a first and second input for each wavelength. One of the first and second inputs receives the converted signal, i.e.

has a particular polarization mode (e.g. TE) which has been converted from a different polarization mode (e.g. TM). The other of the first and second inputs receives the direct signal, i.e. has the same polarization mode directly from the received WDM signal, i.e. without conversion. Thus, the received two inputs at the processing module have the same polarization (TE).

The processing module 104,106,114,128 is configured to output a single output having the same polarization mode, which is the second polarization mode (TE). As described below, the processing module is configured to control the phase difference (to be in phase) between the direct and converted signals (e.g. with the first optical phase shifter 114), such that the received direct and converted signals are converted into two optical signals of equal power (e.g. by the first optical coupler 104). The processing module is further configured to combine the two equal power optical signals of each wavelength. The combining is carried out by controlling the phase of the two equal power signals (e.g. to be $\pi/2$ out of phase, using the second optical phase shifter) such that an element of the processing module (e.g. second optical coupler 106) outputs all received power from its two inputs into a single optical output.

Figure 1B:
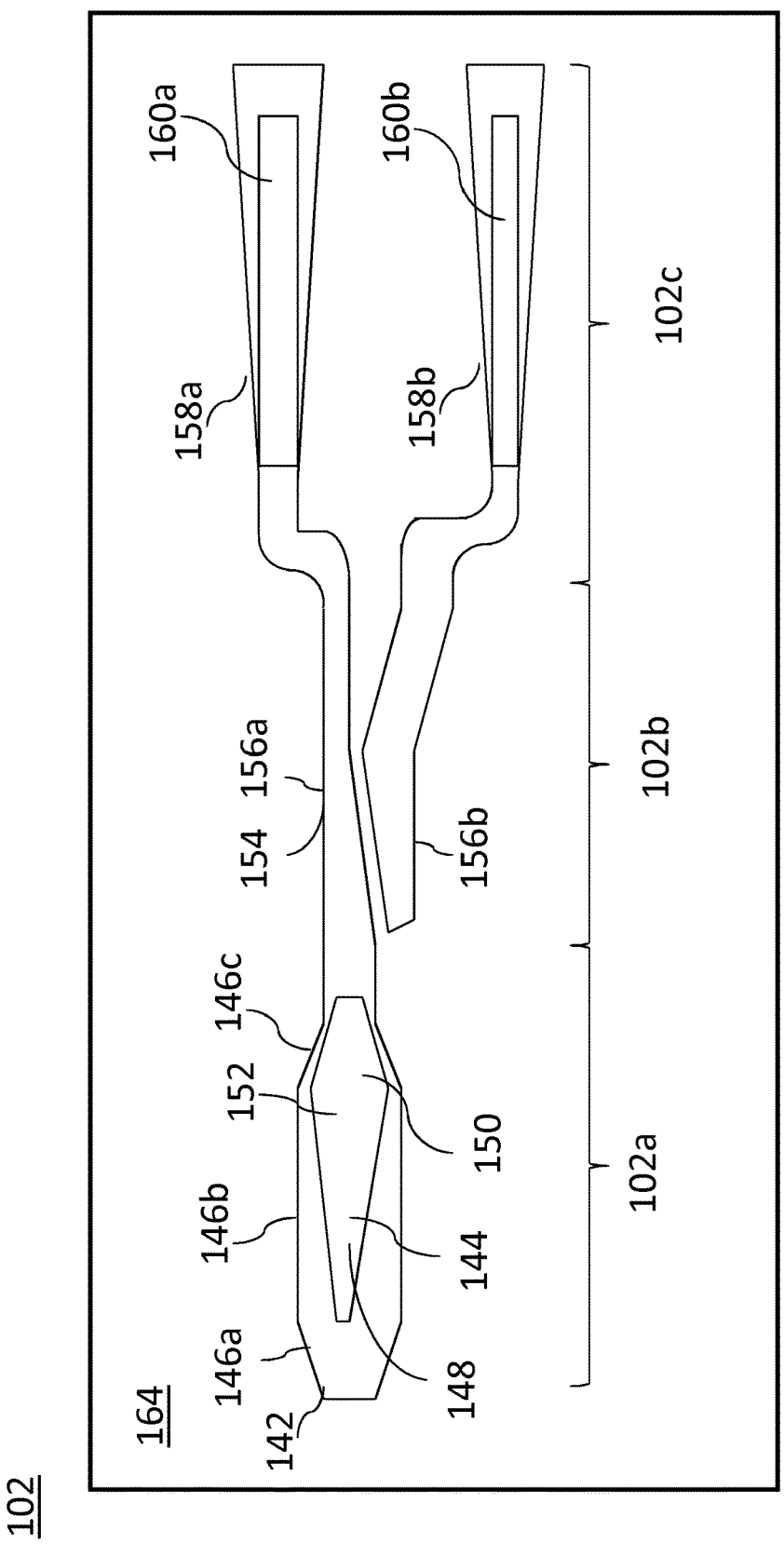
FIG. 1b schematically illustrates a polarization module in accordance with the embodiment.
Figure 1C:
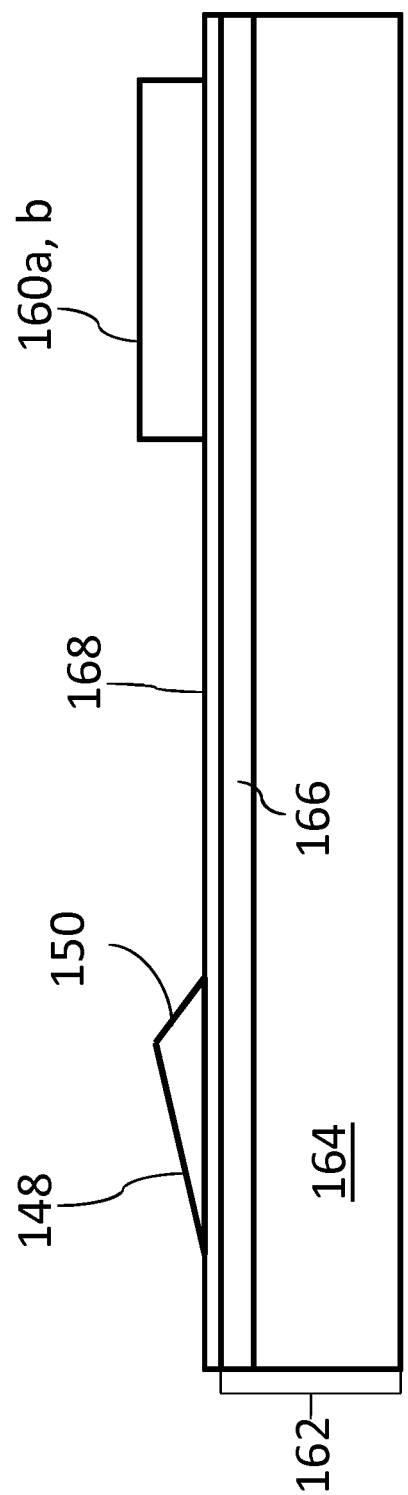
FIG. 1c schematically illustrates a polarization module in sectional view in accordance with the embodiment.

FIGS. 1b and 1c illustrate an example of the polarization handling block 102, in the form of a polarization splitter-rotator (PSR). Alternatively, other types of PSRs may be used. An example sectional layout of polarization handling block 102 is described with reference to FIG. 1c and an example topological layout of polarization handling block 102 is described with reference to FIG. 1b.

Referring to FIG. 1c, an exemplary polarization handling block 102 comprises a base portion 162 formed from a buried oxide (BOX) layer 164 and a semiconductor layer 166 to form a rib and channel waveguide. A semiconductor oxide layer 168 is then formed on the semiconductor layer 166. Semiconductor nitride sub-sections sections 148, 150, 160a and 160b are then deposited on the semiconductor oxide layer 168.

The topological layout of the semiconductor layer 166 and the semiconductor nitride subsections 148, 150, 160a and 160b used to form the polarization handling block 102 is now described, with reference to FIG. 1b.

In FIG. 1b, polarization handling block 102 comprises a mode converter portion 102a, an adiabatic coupling portion 102b and a mode splitter portion 102c.

The mode converter portion 102a comprises first 142 and second 144 waveguide sections. The first waveguide section 142 comprises a semiconductor section 146a which increases in width along its length to a second semiconductor section 146b of uniform and a third semiconductor section 146c which decreases in width. A second waveguide section 144 comprises a first semiconductor nitride sub-section 148 which increases in width along its length. At the end of the first semiconductor nitride sub-section 148 there begins a second semiconductor nitride sub-section 150 which tapers to an apex.

The adiabatic coupling portion 102b comprises an adiabatic coupler 154. The adiabatic coupler 154 comprises first and second interactive semiconductor waveguides 156a and 156b separated by a gap.

The first semiconductor waveguide 156a has a starting width which reduces over the interaction length of the adiabatic coupler 154. The second semiconductor waveguide 156b broadens in width over the interaction length of the adiabatic coupler 154.

The first and second semiconductor waveguides 156a, 156b then diverge to form third 158a and fourth 158b semiconductor waveguides of the mode splitter portion 102c. The third 158a and fourth 158b semiconductor waveguides are each coupled to respective semiconductor nitride output waveguides 160a, 160b.

As the optical signal propagates into the polarization handling block 102, the optical signal first reaches the mode converter portion 102a. In the mode converter portion 102a the transverse electrical polarization mode and the transverse magnetic polarization mode for all wavelength components remain largely unchanged until the propagation of the optical signal reaches the semiconductor section 152. At this point, the semiconductor section 152 begins to widen whilst the second semiconductor nitride section 150 remains unchanged.

The optical properties of semiconductor and semiconductor nitride, particularly birefringence, differ. This difference in the birefringence of the optical material through which the optical signal is propagating causes the effective index ($n_{eff}$) of the transverse magnetic polarization mode to increase. This first causes the transverse magnetic polarization mode for each of the wavelength components to change to a hybrid mode which has optical characteristics of both a transverse magnetic polarization mode and a transverse electrical polarization mode before becoming a transverse electrical polarization mode of order one (TE1) for each wavelength component. That is to say, the use of the semiconductor section 152 and the second semiconductor nitride section 150 to guide the multi-wavelength optical signal causes the transverse magnetic polarization mode (TM) for each wavelength component to convert to a transverse electrical polarization mode of order one at the output of the mode converter portion 102a.

The transverse electrical polarization mode of the propagating optical signal remains a zero order transverse electrical polarization mode (TE0) at the output of the mode converter portion 102a. Therefore, the output from the first and second waveguides 142 and 144, i.e. at the output of the mode converter portion 102a are first and second output transverse electrical polarization modes.

The first and second output transverse electrical polarization modes, for each wavelength component, continue to propagate to the adiabatic coupler portion 102b. The first and second output electrical polarization modes for each wavelength component remain confined in the first semiconductor waveguide 156a of the adiabatic coupler 156 until the second semiconductor waveguide 156b widens and the first semiconductor waveguide narrows where the second output transverse electrical polarization mode, for all wavelength components, becomes substantially confined in the second semiconductor waveguide 156b and the first output transverse electrical polarization mode remains in the first semiconductor waveguide 156a due to the adiabatic coupling between the first 156a and second 156b semiconductor waveguides.

The first output transverse electrical polarization mode for each wavelength component propagates from the first semiconductor waveguide 156a to the third semiconductor waveguide 158a and the second output transverse electrical polarization mode for each wavelength propagates from the second semiconductor waveguide 156b to the fourth semiconductor waveguide 158b.

Third 158a and fourth 158b semiconductor waveguides can only guide zero order transverse electric polarization modes, typically referred to as fundamental modes, and so the second output transverse electrical polarization mode evolves into a zero order transverse electric polarization mode in the fourth semiconductor waveguide 158b. Therefore, the output from the third 158a and fourth 158b semiconductor waveguide is, for all wavelength components, a transverse electric polarization mode.

The configuration of the third 158a and fourth 158b semiconductor waveguides mean that only transverse electric polarization modes can be guided. This provides the polarization insensitivity of the device 100 as after the polarization handling block 102, i.e. only transverse electric polarization modes are propagating through the device 100.

The first and second output zero order transverse electrical polarization modes then propagate to the respective semiconductor nitride output waveguides, 160a and 160b. The first and second output zero order transverse electrical polarization modes then become first and second optical output signals in a step S204. The semiconductor nitride output waveguides 160a and 160b are coupled to first and second output ports 112a and 112b which enable the first optical output signal to propagate to the first phase shifter 114 and the second optical output signal to propagate to the first inner optical waveguide 116.

Figure 1D:
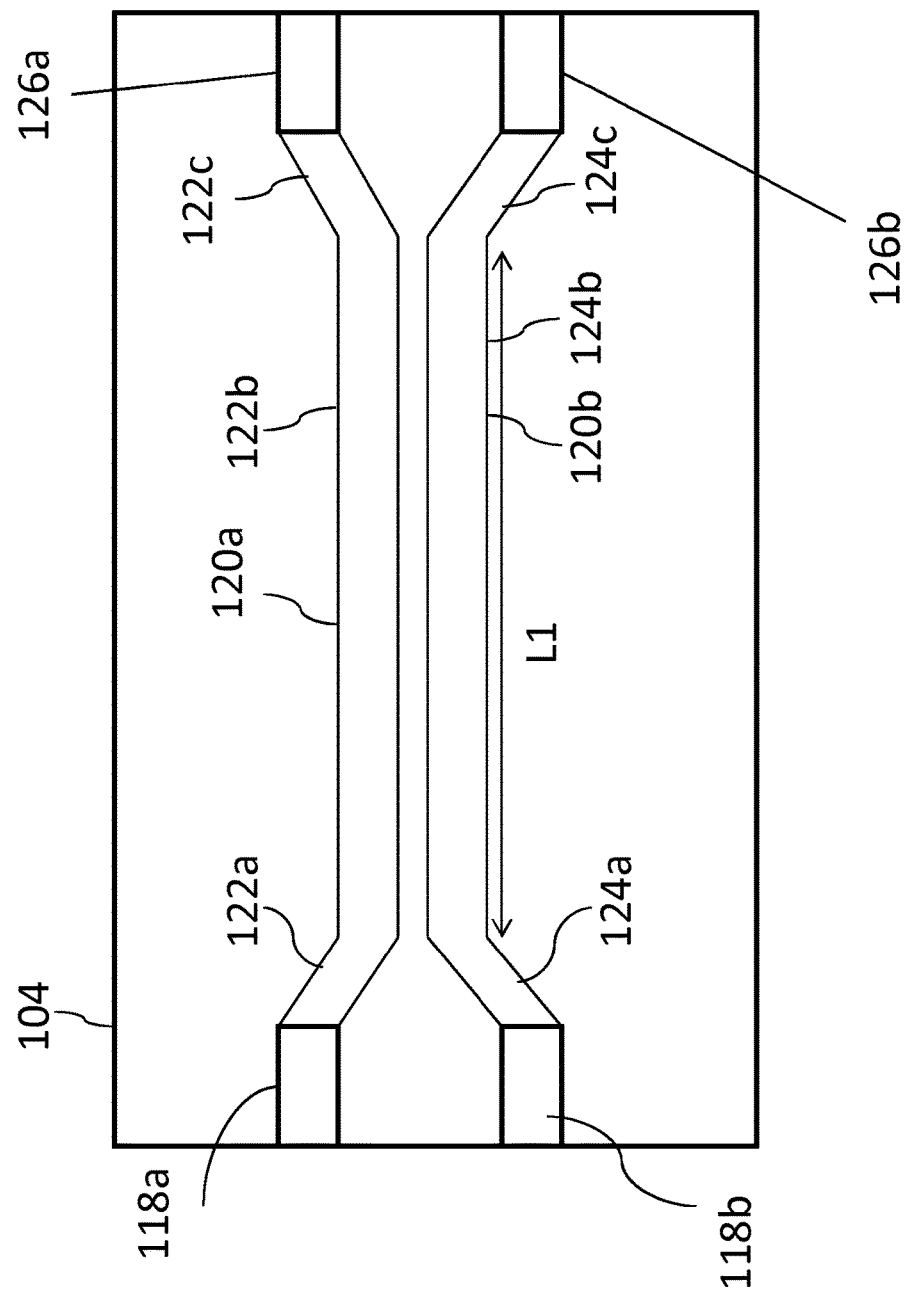
FIG. 1d schematically illustrates a first optical coupler in accordance with the embodiment.

An example implementation of the first optical coupler 104 is now described with respect to FIG. 1d. The first optical coupler 104 is a conventional 3 dB coupler, and it will be appreciated that other constructions of couplers may be used. The first optical coupler 104 comprises first 118a and second 118b input ports. First input port 118a is coupled to the first optical phase shifter 114. Second input port 118b is coupled to the first inner section of single mode optical waveguide 116. The first optical coupler 104 further comprises first 120a and second 120b waveguides. The first waveguide 120a comprises first 122a, second 122b and third 122c waveguide sections. The second waveguide 120b comprises first 124a, second 124b and third 124c waveguide sections. The respective first waveguide sections converge toward each other towards the respective second waveguide sections. The respective second waveguide sections are sufficiently close to each other over an interaction length L1 to enable an exchange of energy between the respective second waveguide sections. After the culmination of the respective second waveguide sections the first and second waveguides culminate in respective diverging third waveguide sections to guide the propagating optical signals towards first 126a and second 126b output ports.

Figure 1E:
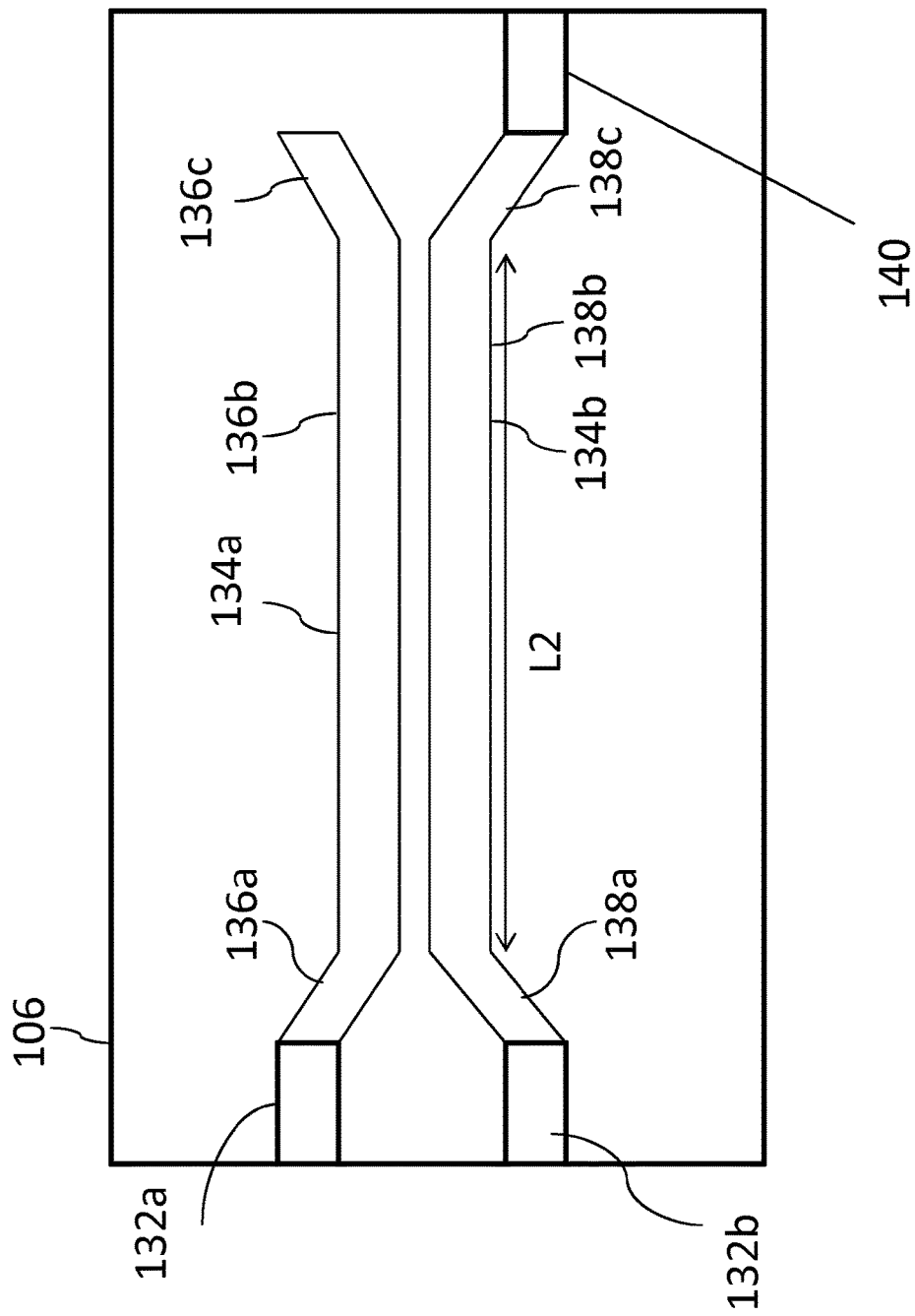
FIG. 1e schematically illustrates a second optical coupler in accordance with the embodiment.

Second optical coupler 106 is now described with reference to FIG. 1e. The second optical coupler 106 is a conventional 3 dB coupler, and it will be appreciated that other constructions of couplers may be used. In some examples, the first and second 3 db couplers are of the same type. The second optical coupler 106 comprises first 132a and second 132b input ports. First input port 132a is coupled to the second inner optical waveguide 130. Second input port 132b is coupled to the second optical phase shifter 128.

Second optical coupler comprises first 134a and second 134b waveguides. The first waveguide 134a comprises first 136a, second 136b and third 136c waveguide sections. The second waveguide 134b comprises first 138a, second 138b and third 138c waveguide sections. The respective first waveguide sections converge toward each other towards the respective second waveguide sections. The respective second waveguide sections are sufficiently close to each other over an interaction length L2 to enable a complete transfer of energy from the waveguide section 136b to the waveguide section 138b. After the culmination of the respective second waveguide sections the first and second waveguides culminate in respective diverging third waveguide sections to guide the propagating optical signals towards output port 140. The phase difference of the two optical signals at the first and second input ports provides for substantially all of the output optical signal to be at the output port 140. As a result of the complete transfer of energy between the waveguide sections 136 and 138b, waveguide section 136c will not guide any components of the optical signal in the optimal operational state.

The first and/or second optical phase shift modules 114 and 128 may be controlled to vary the applied phase shift. For example, the applied phased shift is controlled electronically. In some examples, the phase shift is controlled by a metal heater which is driven by a variable electrical power source. When current is passed through the heater a phase shift is applied to the wavelength components of the multi-wavelength components propagating through the respective first and second optical phase shift modules 114 and 128. It will be understood that other power sources may be used to drive the first and second optical phase shift modules 114 and 128. The phase shift is controlled, e.g. using a processor, in order to ensure that the correct phase is output to the following optical coupler, as described below. The first and second phase shifters may be controlled to vary in response to, and compensate for, changing input phases, e.g. due to thermal or mechanical stresses on the fiber result in varying phase modulation dispersion.

In one embodiment, the phase change of the first and/or second optical phase shift modules 114 and/or 128 is controlled by performing light detection at the output of the waveguide section 136c of the second 3 dB coupler 106. In some aspects, a measurement unit is configured to measure a parameter of the device, and provide feedback for control of the first and/or second optical phase shifters. For example, a photodiode is used to detect optical power. The phase shift applied by the first and/or second optical phase shift modules 114 and/or 128 is controlled to find the condition of a minimum light detection at waveguide section 136c, i.e. maximum dark. In another embodiment, the measurement unit measures an input signal by tapping a small portion of light output of the waveguide section 138c of the second 3 dB coupler 106. The device 100 is configured to find and maintain the condition of maximum light. The phase change of the first and/or second optical phase shift modules 114 and/or 128 is controlled in response to that measurement. In a further example, the measurement unit may detect the phases of the any of the optical signals in order to control the applied first and second phase shifts. Thus, the relative phases received at the first and second optical couplers are maintained, even if the relative phases received from the polarization handling block vary over time.

We will now describe how device 100 is used to process a multi-wavelength optical signal with references to FIGS. 1a to 1e and FIG. 2.

Figure 2:
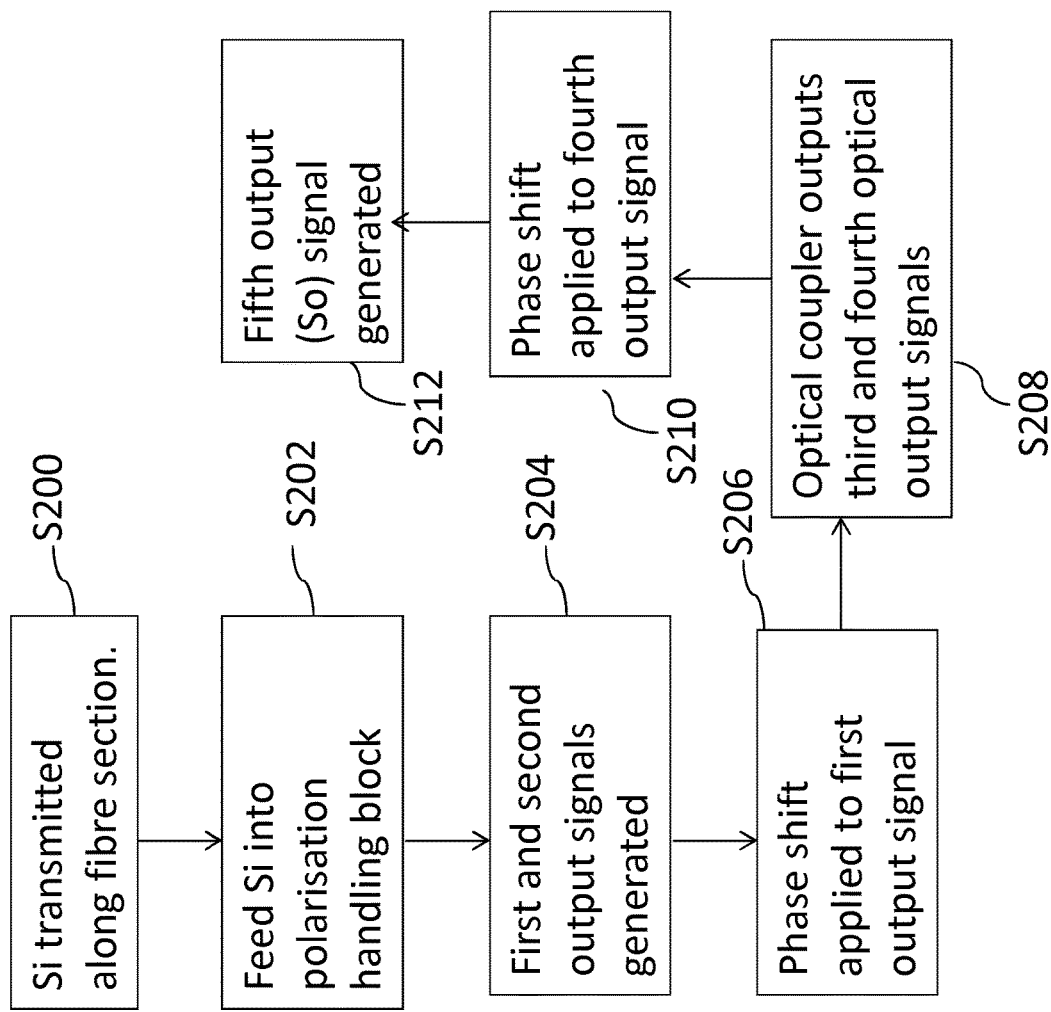
FIG. 2 illustrates method steps in accordance with the embodiment.

Referring to FIG. 2, a multi-wavelength optical signal Si is transmitted along fiber section 108 in a step S200. The optical signal Si is a WDM signal. The transmitter transmitting the WDM signal is an integrated photonics device or circuit. In some examples, the transmitter is configured for point to point applications, e.g. a Digital Unit (DU) or Remote Radio Unit (RRU) interconnected in a radio access network. The WDM wavelengths are generated in the same place and the transmission of the wavelengths has all of the wavelengths aligned in polarization. In a further example, a plurality of devices are connected by fibers in an optical network. For example, the optical network may comprise one or more reconfigurable optical add-drop multiplexer (ROADM). Some of the transmitted wavelengths may be in by-pass, and some may be added.

For any example, the transmitter may be implemented as a silicon photonics device. As such, all of the wavelengths are polarization aligned, since the silicon photonic device generates a single polarization, and all the wavelengths will be TE-aligned.

During transmission of the WDM signal along the fiber 108, the polarization of each of the wavelengths of respective signals varies in a generally unpredictable way, for example, depending on temperature and other environmental factors.

The optical signal (Si) that is received from the optical fiber 108 is generally elliptically polarized. That is to say, each of the wavelength components comprises a transverse electrical polarization (TE) mode and a transverse magnetic polarization (TM) mode. In the elliptic polarization, the transverse electric polarization mode and the transverse magnetic polarization mode have arbitrary amplitudes and phases. Thus, at the device input 110, all of the wavelengths of the optical signal Si generally have the same elliptical polarization, with a component in TE and a component in TM, with any amplitudes and relative phase.

However, the polarization of the wavelengths will each change uniformly due to dispersion (PMD) caused by randomly varying birefringence of the fiber 108, which causes changes in the polarization modes of the optical signal being transmitted.

As will described in more detail below, the wavelengths to be transmitted are selected to be within a predetermined bandwidth. The bandwidth is determined such that the wavelengths within the bandwidth have polarization modes have a variation which is substantially uniform among the wavelengths. Thus, if the wavelengths are inside the defined bandwidth, also termed the principal states of polarization bandwidth Δλ, of the fiber 108, the polarization of each wavelength will change consistently with each other wavelength. Thus, all of the transmitted wavelengths may be considered as polarization aligned at the output of the fiber 108, and input of the device 100. The transmitter is therefore configured to transmit only wavelengths for which the polarization mode dispersion is substantially the same, and hence for which the receiving device 100 can handle as an input WDM signal.

The propagation of the multi-wavelength optical signal along fiber section 108 results in the multi-wavelength optical signal being fed into the polarization handling block 102 due to the coupling at input 110 between the fiber section 108 and the polarization handling block 102 in a step S202.

The polarization handling block 102 is configured to receive WDM signals, wherein each wavelength comprises components of a transverse electric polarization TE mode and a transverse magnetic polarization TM mode. The polarization handling block 102 is configured to convert the transverse magnetic polarization mode component of the elliptically polarized signal Si to a transverse electric polarization mode. The polarization handling block 102 is configured to output only wavelengths having one or more transverse electric polarization mode. The polarization handling block 102 has two outputs: one for outputting the received transverse electric polarization mode and one for outputting the transverse electric polarization mode converted from the transverse magnetic polarization mode.

Generally, the received multi-wavelength optical input signal Si will comprise elliptically polarized carrier signals due to the differential group delay of the fiber 108. The wavelengths may alternatively be considered as optical carrier signals. The wavelengths or carrier signals may be modulated (e.g. by the transmitter) to carry information. Since, the transmitted wavelengths are all within the principal states of polarizations bandwidth of the optical fiber, each carrier signal (wavelength) will have substantially the same arbitrary state of polarization. The polarization module 102, also termed the polarization handling block 102, resolves the elliptically polarized carrier signals into their transverse electric TE and transverse magnetic TM mode component signals and then converts the transverse magnetic TM mode signals into transverse electric TE mode signals. The converted and directly derived signals are then output as respective signals of the same mode having arbitrary amplitudes and phases according to the state of the elliptically polarized signal Si.

The polarization handling block 102 therefore provides the effect that the transverse magnetic polarization mode of the optical input signal Si, for all wavelengths, is converted into a transverse electric polarization TE mode. This means that the elements that follow the polarization handling block 102 need only process transverse electric polarization TE modes, thereby avoiding a duplication of the photonics processing circuit with benefits in terms of cost, chip real estate and power consumption.

Although the polarization handling block 102 is described above in relation to FIG. 1b, it will be understood that a polarization splitter and rotator may also be used to split the transverse electric polarization mode and the transverse magnetic polarization mode and rotate the transverse magnetic polarization mode to form a transverse electric polarization mode before outputting two signals which both comprise a transverse electric polarization mode.

The first phase shifter 114 applies a phase shift to each wavelength component of one or the outputs from the polarization handling block 102, e.g. the first output optical signal S1 in a step S206. The phase shift applied by the first phase shifter 114 is continuously controlled to be equal and opposite to the phase difference between the two output signals S1, S2 of the polarization handling block 102, so as to bring the first and second signals S1, S2 into phase at the respective inputs of the first optical coupler 104. The phase of the second output optical signal S2 is substantially unchanged by the first inner waveguide 116. Each wavelength component of the first optical output signal S1 is therefore phase shifted and, following the phase shift, the wavelength components of the phase shifted first output optical signal S1a are in phase with each wavelength component of the second output optical signal S2.

The phase shifted first output optical signal S1a continues to propagate to the first input port 118a of the first optical coupler 104. The second output signal S2 continues to propagate to the second input port 118b of the first optical coupler.

The first optical coupler 104 is a 3-dB optical coupler. The phase changed wavelength components of the first output optical signal S1a propagates into the first waveguide section 122a of the first waveguide 120a which guides the wavelength components of the first output optical signal towards the second waveguide section 122b of the first waveguide 120a. The wavelength components of the second output optical signal S2 propagate to the first waveguide section 124a of the second waveguide 120b which guides the wavelength components of the second output optical signal S2 towards the second waveguide section 124b of the second waveguide 120a.

As the wavelength components of the first and second output optical signals S1a, S2 (i.e. the optical signals into the first optical coupler 104) are propagating in phase, the first optical coupler 104 outputs two output signals of equal optical power. In particular, in the respective second waveguide sections 122b and 124b, an exchange of energy occurs which distributes the power equally between the wavelength components of the first and second output optical signals to form third and fourth optical output signals S3, S4, which are of equal optical power which respectively then propagate towards the respective diverging third waveguide sections 122c and 124c in a step S208.

The third waveguide sections are respectively coupled to first and second output ports 126a and 126b. The wavelength components of the third optical output signal S3 propagate through first output port 126a which is coupled to the second inner waveguide section 130. The wavelength components of the fourth optical output signal S4 propagate through second output port 126b to the second optical phase shifter 128.

The effect of the first optical phase shifter 114 is to bring the first and second signals S1, S2 into phase at the input of first optical coupler 104, which enables the first optical coupler 104 to generate third and fourth output signals S3, S4 of equal power and with a phase difference according to the power distribution of the first and second signals S1, S2. Each of the third and fourth optical output signals S3, S4 comprises only a transverse electrical polarization mode for each wavelength component.

The second optical phase shifter 128 applies a continuously variable second phase change to the wavelength components of the fourth optical output signal S4 in a step S210 such that the phase difference between the phase shifted fourth optical output signal and the third optical output signal is $\pi/2$ at the respective inputs of the second optical coupler 106. The variable phase shift applied by the second phase shifter 128 is such that the all the light at the second optical coupler 106 is output from only one particular output, as will be described hereinafter. Thus, the second phase shifter provides for the phase difference ($\pi/2$) between the two optical inputs, of equal power, into the second optical coupler 106 that provides for all, or a maximum, of power to a defined one of two outputs of the second optical coupler 106.

The second inner waveguide section 130 is coupled to the first input port 132a of the second optical coupler 106 and the second optical phase shifter 128 is coupled to the second input port 132b of the second optical coupler 106. Therefore, the wavelength components of the third optical output signal propagate to the second optical coupler 106 and the phase shifted fourth optical output signal propagate to the second optical coupler 106.

The second optical coupler 106 is a 3-dB optical coupler. The second optical coupler 106 has a single output port 140, to which all of the WDM signals are directed. All the light is coupled into the single output port due to the appropriate selection of the phase shift and amplitudes of the signals applied to its respective inputs i.e. if the signals are of the same amplitude and $\pi/2$ out of phase.

At the second optical coupler 106, the wavelength components of the third optical output signal propagate to the first waveguide section 136a of the first waveguide 134a where it is guided to the second waveguide section 136b of the first waveguide 134a. The wavelength components of the fourth optical output signal propagate to the first waveguide section 138a of the second waveguide 134b where they are guided to the second waveguide section 138b of the second waveguide 134b.

The respective second waveguide sections are close enough to each other to enable a transfer of energy to take place between the second waveguide sections. As the wavelength components of the third and fourth optical output signals are in phase, all of the optical power is transferred to a single output port 140 which enables an optical output signal (So) to be formed at the output of the device 100 which comprises a plurality of wavelength components each comprising a transverse electric polarization mode in a step S212.

The effect of the second optical phase shifter 128 is to bring the third and fourth signals S3, S4 into the correct phase difference of $\pi/2$ at the input of second optical coupler 106, which enables the second optical coupler 106 to generate a single output signal (So) comprising multi-wavelength optical signals of the same transverse electrical polarization mode.

Generally, the received multi-wavelength optical input signal will comprise elliptically polarized carrier signals due to the differential group delay of the fiber. Since, the transmitted wavelengths are all within the principal states of polarizations bandwidth of the optical fiber, each carrier signal will have substantially the same arbitrary state of polarization. The polarization module resolves the elliptically polarized carrier signals into their transverse electric and transverse magnetic mode component signals and then converts the transverse magnetic mode signals into transverse electric signals or vice-versa.

The converted and directly derived signals are then output as respective signals of the same mode having arbitrary amplitudes and phases according to the state of the elliptically polarized signal. The first optical phase shift module then puts the two signals into a first phase at the input of first optical coupler, which enables the optical coupler to output two signals of equal power and with a phase difference according to the power distribution of the two input signals. The second optical phase shift module then puts the two signals into a second phase at the input of second optical coupler, which enables the optical coupler to output a single signal comprising multi-wavelength optical signals of the same amplitude and polarization mode.

That is to say, using device 100 to process a multi-wavelength optical signal enables the conversion of the transverse magnetic polarization modes of the multi-wavelength signal into transverse electric polarization modes and outputs a single multi-wavelength signal comprising only a single (e.g. transverse electric) polarization mode for each of the wavelength components of the multi-wavelength signal. Device 100 converts the transverse magnetic polarization modes of the multi-wavelength signal without the requirement of a processing circuit for the transverse electric polarization mode and a separate processing circuit for the transverse magnetic polarization mode. This reduces the form factor of semiconductor photonics circuits that are used to process multi-wavelength optical signals.

Additionally, as the device 100 requires only a single set of circuitry and a single set of controls to convert the transverse magnetic polarization mode of the wavelength components of multi-wavelength optical signal into a transverse electric polarization mode for each of the wavelength components, the complexity of the semiconductor photonics circuits used to process multi-wavelength optical signals is significantly reduced.

Moreover, as device 100 only outputs a multi-wavelength optical signal comprising transverse electric polarization modes, the polarization modes of the multi-wavelength input signal can be arbitrary. The effect of this is that device 100 can significantly reduce the effects of polarization sensitivity in the TE based processing circuitry that follows.

This means that device 100 can be used in any application where a multi-wavelength optical signal is used as device 100 will reduce the effects of polarization sensitivity in the following TE based processing circuitry.

Device 100 provides an additional benefit in a wavelength division multiplexed optical transmission system which we will now describe.

Device 100 may also be used where an optical signal comprising a single polarization state, such as a single transverse magnetic polarization mode, has been propagated through optical fiber section 108. In this instance, the transverse magnetic polarization mode will propagate through the polarization handling block 102, as described above, and be converted into a single transverse electric polarization mode at the output of the polarization handling block 102. As the polarization handling block 102 will output only one signal, only one signal will be propagated to the first optical coupler 104. As the first optical coupler 104 is a 3-dB coupler, it will still output two output signals with identical optical power and a phase difference according to the power distribution of the first and second output signals S1, S2.

Figure 3A:
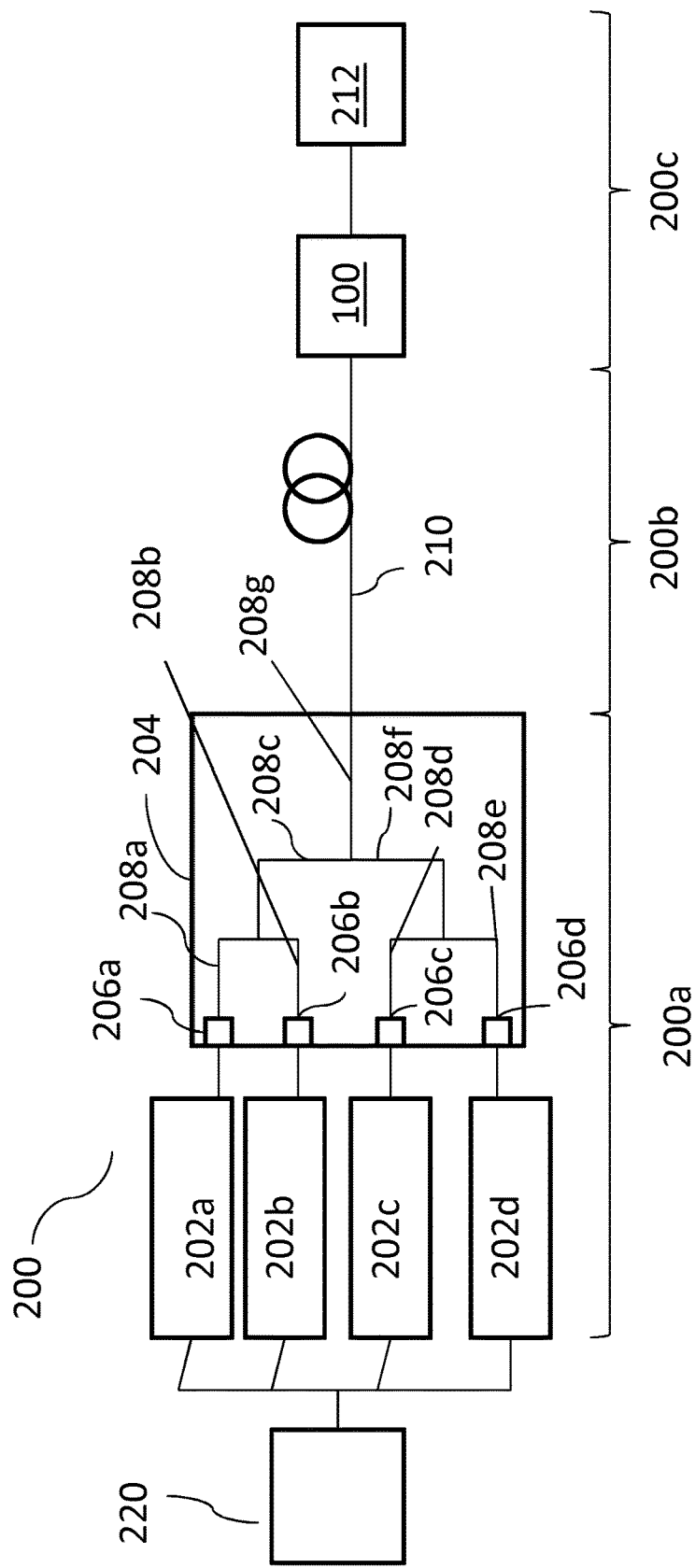
FIG. 3a schematically illustrates a system comprising a device in accordance with the embodiment.

Device 100 may be used as part of a signal processing circuit in a WDM optical transmission system 200 which is now described in reference to FIG. 3a. For example, the device 100 may be the first part, or receiver, of a larger circuit. The device 100 and/or larger circuit may be an integrated photonics circuit or photonic chip. It will be understood by the skilled person that transmission system 200 is described by way of example and that the effects described can be implemented in any optical transmission system.

Figure 3B:
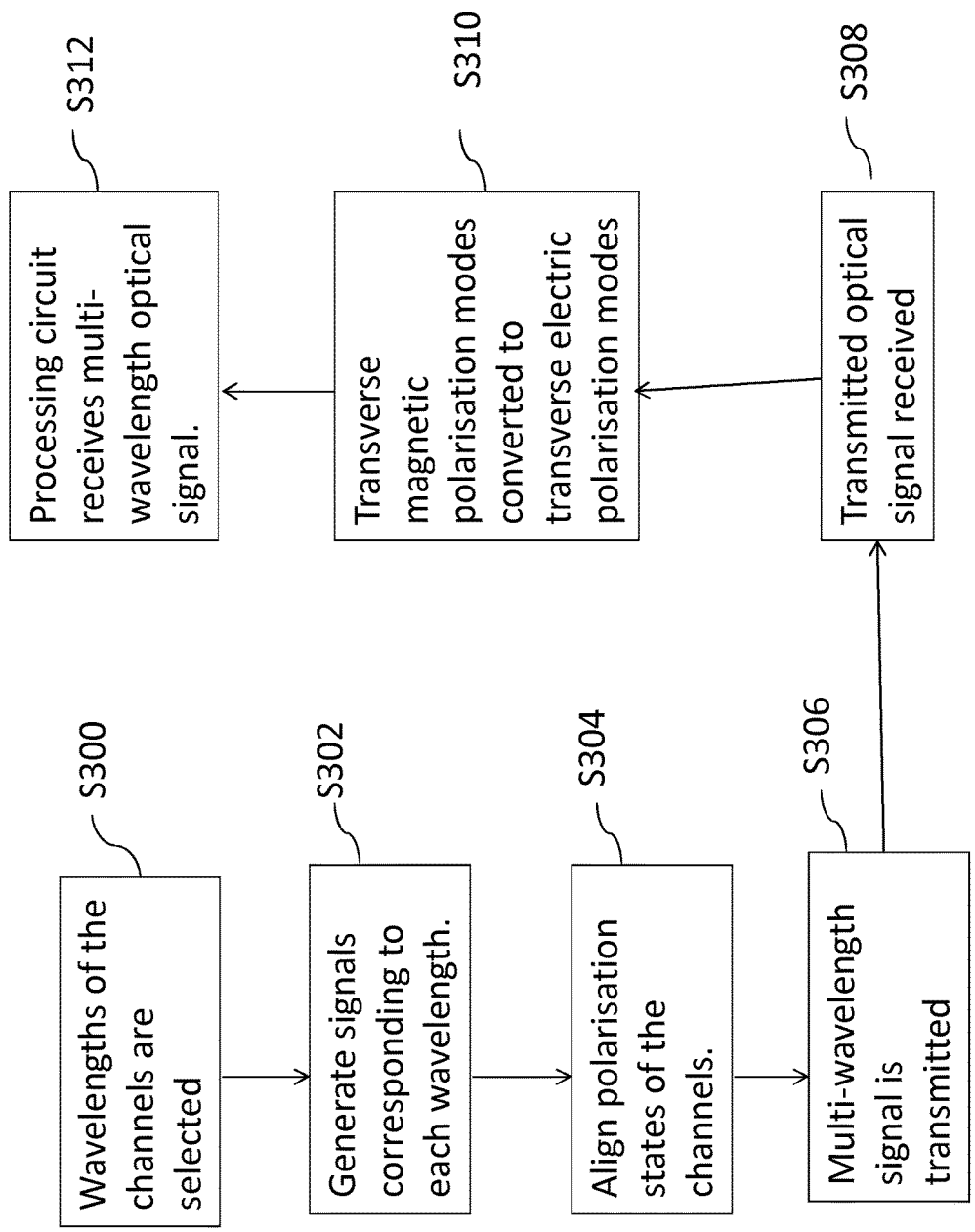
FIG. 3b illustrates method steps in accordance with the embodiment.

We also describe the steps in the transmission of multi-wavelength optical signal (Si) through transmission system 200 using FIG. 3b.

An example transmission system 200 comprises three components: a transmission module 200a, a transmission medium 200b and a receiver module 200c. The transmission system 200 also comprises a control unit 220 which enables the number of signals that are to be transmitted using the transmission system 200 to be set and/or the wavelengths of those signals to be selected in a step S300.

An example transmission module 200a (i.e. transmitter) comprises a generator unit configured to generate the plurality of wavelengths. For example, the generator unit comprises a plurality of wavelength generators, e.g. lasers, 202a, 202b, 202c and 202d are used to generate optical signals for four channels, C1, C2, C3 and C4. In some examples, the lasers are distributed feedback (DFB) lasers. For example, the wavelengths generated are spaced by 200 GHz (approximately 1.6 nanometers) in a step S302. The wavelengths of each channel are respectively 1554.5, 1556.1, 1557.7 and 1559.3 nanometers as selected using the control unit 220. This gives a channel separation of 1.6 nanometers (or 200 GHz) when the multi-wavelength optical signal is transmitted through the transmission medium 200b. Transmission module 200a further comprises a polarization maintaining coupler 204.

The wavelengths of channels C1, C2, C3 and C4 are selected to fall within the determined wavelength bandwidth, or bandwidth of the principal states of polarization (PSP). In particular, the spacing between the wavelengths and/or number of wavelengths is selected such that all the transmitted wavelengths are within the determined bandwidth. Within the determined wavelength bandwidth, the polarization modes of the wavelengths will vary uniformly, e.g. the differential group delay of single mode fiber will remain substantially constant over frequency.

The wavelengths generated by said generator unit within the principal states of polarizations bandwidth of the optical fiber, are thus wavelengths in which the optical carrier signals of the transmitted multi-wavelength optical signal are subjected to the same differential group delay along the optical fiber, such that the polarization state of each of the optical carrier signals of the multi-wavelength optical signal are substantially aligned at said receiver module and usually exist in the form of elliptically polarized waves, which can be resolved into transverse electric polarization (TE) and a transverse electric magnetic polarization (TM) mode waves.

The principal state of polarization bandwidth $\Delta\lambda$ of an optical fiber comprises a range of wavelengths that have a reasonably constant differential group delay (DGD) along the fiber, so that each wavelength is subjected to substantially the same polarization changes as other wavelengths in the bandwidth. The relationship defining the principal state of polarization (PSP) bandwidth $\Delta\lambda$ is described in more detail, for example, in, A. Steinkamp, S. Vorbeck, E. Voges: "Polarization mode dispersion and polarization dependent loss in optical fiber systems", Optics East, 2004—proceedings.spiedigitallibrary.org.

The determined bandwidth $\Delta\lambda$ (in units of nanometers) may be defined as:

$$\Delta\lambda = 1 \text{ [nm]}/\langle\Delta_T\rangle\text{[ps]}$$

Where $\langle\Delta_T\rangle$ is the average differential group delay (in units of picoseconds) of the transmission medium 200b and is given by:

$$\langle\Delta_T\rangle = \text{PMD coeff.} \times L^{1/2}$$

where the PMD coeff. is a coefficient indicating the phase modulation dispersion of the fiber. The PMD coefficient indicates a physical property of the fiber. L is the length of the fiber between the transmitter and receiver. Thus, the bandwidth of the PSP is based on the amount of the phase modulation dispersion of the fiber and the length of the fiber.

The bandwidth of PSP may be defined as the frequency range over which the first-order approximation of the PSP can be assumed valid. The smaller the PSP bandwidth, the more the PMD vector will change with frequency. The bandwidth of PSP may also be referred to as $\Delta\lambda_{PSP}$.

For a PMD coefficient of 0.02 ps/km$^{1/2}$ and a length of fiber of 10 km the available $\Delta\lambda$ is of approximately 16 nm.

The transmitter and/or receiver of the present disclosure are configured to operate using wavelengths which extend over a bandwidth which is equal to, or less than, the determined bandwidth $\Delta\lambda$. Thus, the transmitted wavelengths together occupy a bandwidth which is less than the bandwidth of PSP $\Delta\lambda$.

The effect of selecting wavelengths in this bandwidth means that the polarization states of the respective wavelengths will remain substantially uniform throughout transmission through the optical fiber. In some aspects, the differential group delay will remain constant. This allows processing of all the wavelengths using the receiving module, also termed a receiver, as described above.

After the signals for each of the four channels C1, C2, C3 and C4 have been generated, they pass through a polarization maintaining coupler 204, also termed a multiplexer or multiplexer unit, to keep the alignment during the wavelength multiplexing process. Thus, the transmitter is configured to transmit the wavelengths with aligned states of polarization. The states of polarization of the wavelengths are therefore aligned at the input of the optical fiber. This is the case whether the optical wavelengths are generated together, or whether some wavelengths are added to existing wavelengths, e.g. in a ROADM.

The linear polarization states of all the generated wavelengths are aligned at the input of the multiplexer and are multiplexed in a way which maintains their alignment at transmission into the fiber. During transmission along the fiber, the different wavelengths change their states of polarization due to differential group delay (DGD). However, since all wavelengths are selected to lie in the bandwidth of the principal states of polarizations, the DGD is reasonably constant and thus the polarization uniformity among the various wavelengths remain substantially constant at the fiber output.

The present disclosure enables the transmission of a set of wavelengths through a length of fiber (e.g. SMF) to a single polarization semiconductor photonics circuit having a low polarization sensitivity and a low loss. The present disclosure avoids a duplication of the photonics processing circuit with benefits in terms of cost, chip real estate and power consumption, which are crucial in circuits having a high scale of integration.

Polarization maintaining coupler 204 comprises input ports 206a, 206b, 206c and 206d each coupled to a short section of optical fiber situated between the respective DFB laser, 202a to 202d and the respective input port 206a to 206d for propagation of the optical signals generated by the four DFB lasers 202a to 202d into the polarization maintaining coupler.

The polarization maintaining coupler 204 comprises seven sections of polarization maintaining waveguide, 208a, 208b, 208c, 208d, 208e, 208f and 208g.

Sections 208a and 208b are fused to section 208c. Sections 208d and 208e are fused to section 208f. Sections 208c and 208f are fused to section 208g.

After generation, the signals for each of the four channels propagate into the polarization maintaining coupler 204 through a respective input port 206a, 206b, 206c and 206d. As the respective input ports 206a to 206d are coupled to a respective section of polarization maintaining waveguide 208a, 208b, 208d and 208e, the signals each propagate into a section of polarization maintaining waveguide 208a, 208b, 208d and 208e.

Due to the fusion of sections 208a and 208b to section 208c, the signals for the first and second channels are combined in section 208c. Similarly, the signals for the third and fourth channels are combined in section 208f. The effect of this is that third and fourth signals are produced which are respective combinations of the first and second signal and the third and fourth signal.

The fusion of sections 208c and 208f to section 208g mean that the third and fourth signal are then combined to form a fifth signal which is a combination of the signals from each of the four channels. That is to say, the polarization maintaining coupler 204 acts as a multiplexer to combine the signals in a step S304 for each of the four channels into a single, multi-wavelength (WDM) signal comprising a wavelength component corresponding to each of the channels C1, C2, C3 and C4.

As the waveguide sections 208 to 208g are polarization maintaining sections, the polarization states of all of the channels are kept aligned prior to propagation through the transmission medium 200b. Circuitry other than polarization maintaining coupler 204 may be used to multiplex the signals corresponding to channels C1, C2, C3 and C4. The multi-wavelength optical signal comprising the wavelength components corresponding to each of the channels C1, C2, C3 and C4 is then propagated along the section of SMF 210 to the receiving module 200c in a step S306 where the section of SMF 210 is coupled to the device 100 at input port 110.

The multi-wavelength optical signal is then received by device 100 in a step S308 after propagation through the section of SMF 210. As the wavelength components are centred at wavelengths which fit within the wavelength bandwidth $\Delta\lambda$, the polarization states of the wavelength components are changed uniformly by the fiber SMF 210. That is to say, that due to the individual wavelength components falling within the wavelength bandwidth $\Delta\lambda$ the polarization states of the wavelength components that have been aligned at the fiber input, evolve in the same way as each other during the fiber transmission.

Device 100 then converts the transverse magnetic polarization modes of each of the wavelength components into transverse electric polarization modes as described with relation to FIG. 1 in a step S310. This means that processing circuit 212 receives the wavelength components in a step S312 of the multi-wavelength optical signal as a single transverse electric polarization mode and can process the multi-wavelength optical signal as such.

The processing performed at the processing circuit 212 is therefore not influenced by polarization sensitivity as only transverse electric polarization modes need be processed to accurately process the wavelength components of the received optical signal.

Therefore, if processing circuit 212 comprises an optical switch which is operative to divert any of the wavelength components to another part of a wider optical network or processing circuitry, the signal corresponding to the wavelength component can be transmitted without the application of polarization compensation which may be needed due to polarization sensitivity in the processing circuit.

Additionally, it may be that the number of channels being transmitted in the transmission system 200 can change, i.e. the number of wavelength components that need to be transmitted in the transmission system 200 can change.

An example would be if transmission module 200a formed part of an add/drop arrangement where the transmission module 200a generated signals responsive to an optical signal being received upstream of transmission module 200a. If, say, transmission system 200 had been configured, as above, for the transmission of four channels, i.e. C1, C2, C3 and C4, and, say, the operator wished to add two channels, C5 and C6, say, then the polarization insensitivity at the processing circuit can be maintained provided the wavelength of channels C5 and C6 was within wavelength bandwidth A (including channel separation). This means that transmission system 200 is scalable due to the alignment of the polarization states of the wavelength components at the section of SMF 210 and the use of device 100 to convert the magnetic polarization states of the wavelength components of C5 and C6 in addition to channels C1, C2, C3 and C4 provided that the wavelengths of all of the channels fall within wavelength bandwidth $\Delta\lambda$.

Channels are generally added to optical transmission systems such as transmission system 200 to respond to an increasing need for capacity in the transmission system 200. Provided the wavelength of channels added to transmission system 200 are within wavelength bandwidth $\Delta\lambda$, the polarization insensitive processing at processing circuit can be maintained provided the polarization states of all channels are aligned at the input to the fiber section 210 and the multi-wavelength signal comprising the wavelength components corresponding to each channel is fed to device 100 prior to being fed into the processing circuit.

The effects of aligning the polarization states of all channels at the input to the fiber section 210 and using device 100 prior to processing the signal are ensured by utilising channels that are centred on wavelengths within wavelength bandwidth $\Delta\lambda$. It is therefore possible to realise similar effects even if other fiber sections, such as, for example, dispersion compensating fiber, large effective area fiber and dispersion sloped fiber, are used, providing the bandwidth of the channels fall within the wavelength bandwidth $\Delta\lambda$ which is calculated using the average differential group delay of the fiber sections. Where bit-rates are increased, it may be desirable to implement a dispersion managed system which involves the use of dispersion compensating fibers, large effective area fibers and dispersion sloped fibers. It will be understood that the effects set out above in respect of transmission system 200 can still be realised even if the transmission medium comprises fibers other than SMF.

As set out above with reference to FIG. 1, the device 100 will output from output port 140b a multi-wavelength optical signal wherein the wavelength corresponding to each channel, that is C1 propagated at 1554.5 nanometers, C2 propagated at 1556.1 nanometers, C3 propagated at 1557.7 nanometers and C4 propagated at 1559.3 nanometers comprise only a transverse electrical polarization mode. Four wavelengths have been described as an example only, and more or fewer wavelengths may be transmitted or received.

Figure 3C:
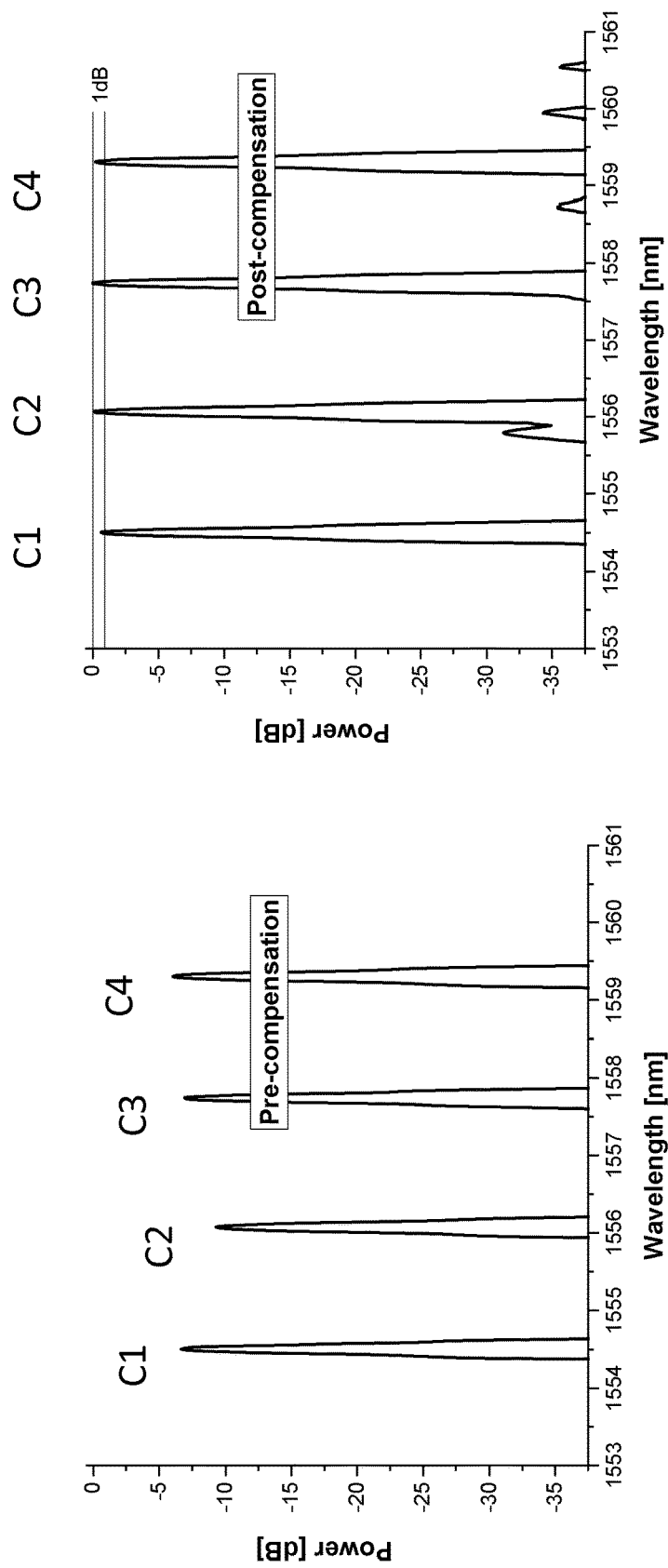
FIG. 3c illustrates output from a system comprising a device in accordance with the embodiment.

FIG. 3c illustrates the effect that the device 100 and the alignment of the polarization states using the polarization maintaining coupler 204 has on the transmission of the multi-wavelength optical signal.

FIG. 3c shows the difference in the received optical power that can be obtained by aligning the polarization states at the input of the SMF section 210 and using the device 100 to remove the polarization sensitivity in the processing circuit 212 (denoted post-compensation) in comparison to not aligning the polarization states and not using the device 100 to remove the polarization sensitivity (denoted pre-compensation). We can also see that the power imbalance across the channels (post compensation) is within 1 dB, which demonstrates the stability of the described approach across channels where the wavelength of the channels fall within the wavelength bandwidth λ.

Figure 4:
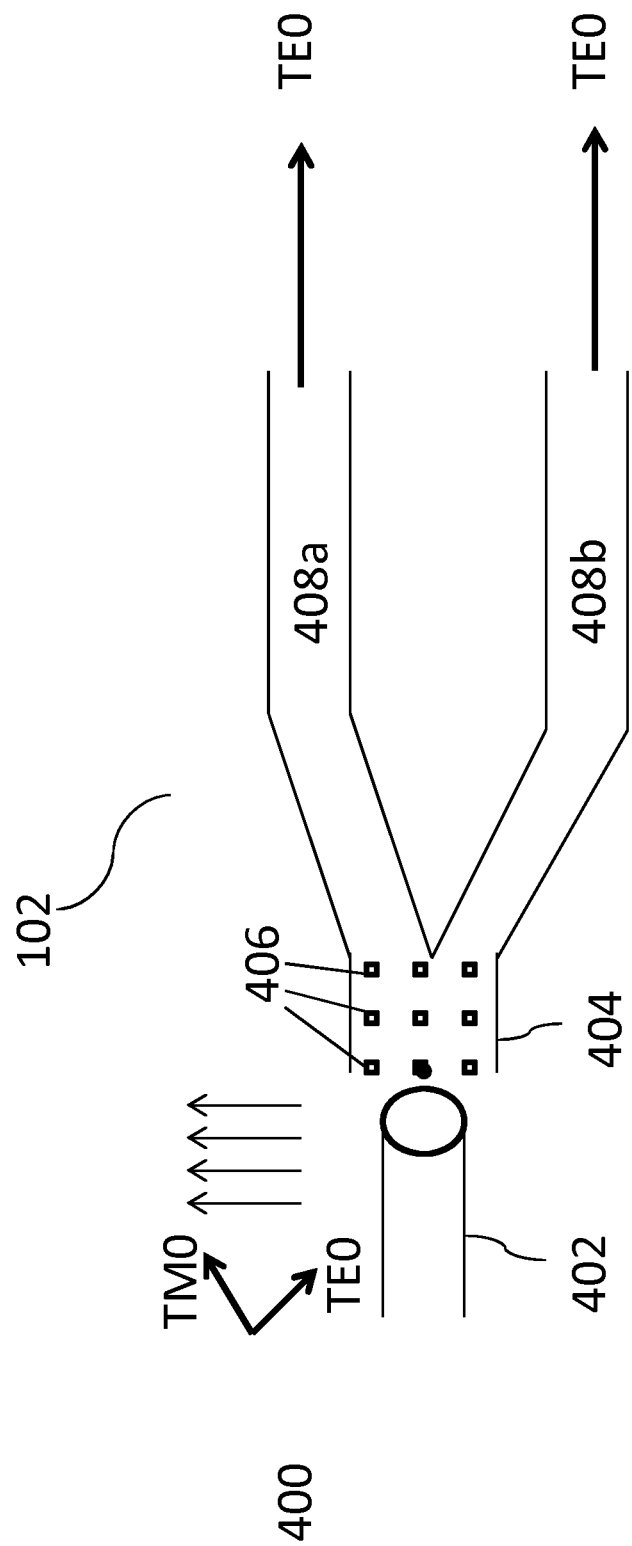
FIG. 4 schematically illustrates an alternative polarization module in accordance with the embodiment.

Optionally, additionally or alternatively polarization handling block 102 may comprise a grating coupler 400 as illustrated in FIG. 4. Grating coupler 400 is arranged to couple to an optical fiber section 402 such that the optical fiber section 402 is perpendicular to the grating coupler 400. However, any angle of attachment between the optical fiber sections 402 and the grating coupler 400 may be used if appropriate compensation is provided at the output. Grating coupler 400 comprises a grating element 404 which is position directly adjacent the point where the optical fiber section 402 is coupled to the grating coupler 400. Grating element 404 comprises a grid formed in the grating 400 which comprises a plurality of raised protrusions 406. The grating coupler 400 comprises first 408a and second 408b waveguide arms which guide light diffracted by the grating element 404.

When a multi-wavelength optical signal is propagated through optical fiber section 402, the multi-wavelength optical signal propagates into the grating element 404. If fiber section 402 is perpendicular to grating coupler 402, then the transverse electric polarization modes and the transverse magnetic polarization modes of the wavelength components will be individually diffracted by the grating element 404 to form first and second transverse electric polarization modes which will propagate in the respective first 408a and second 408b waveguide arms to form the first and second optical output signals which will comprise only transverse electric polarization modes for each of the wavelength components of the multi-wavelength optical signal.

The first and second optical output signals are then respectively propagated to the first optical phase shifter 114 and the first optical coupler 104 which function as described above, i.e. using optical phase shifter 114 and waveguide section 116.

A system and method in accordance with the first and second aspects enables a multi-wavelength optical signal to be transmitted through an optical fiber and processed in a polarization insensitive way, for example by a by a transverse electric polarization (TE) or a transverse electric magnetic (TM) photonic circuit. This is enabled by selecting the wavelengths of the multi-wavelength optical signal to be within the principal states of polarization bandwidth, aligning the polarization states of the wavelength components prior to transmission along the fiber and processing them at the receiver, such that the transverse magnetic polarization modes are converted into transverse electric polarization modes or vice-versa.

This solution provides scalable solutions to the increasing demand on optical networks as channels may be added to the multi-wavelength optical signal and the polarization insensitive processing will not be affected, provided the wavelengths of the added channels are within the principal states of polarization bandwidth.

By aligning the polarization states of the wavelengths of the multi-wavelength optical signal at the input of the optical fiber, for example using a maintaining coupler, the polarization states of the wavelengths at the receiver are substantially the same, which means that polarization insensitive signal processing can be enabled as the polarization states of all wavelengths can be converted into and processed as one polarization mode.

The optical fiber may comprise a section of single mode fiber but may additionally comprise sections of other types of optical fiber such as, for example, dispersion compensation fiber, dispersion sloped fiber and large effective area fiber. The effects set out above can be realised provided the wavelengths of the channels are selected to be within the principal states of polarization of the fiber.

The device and method has been described as having first and second optical phase shifters connected to particular optical paths. The device and method may use any arrangement of phase shifters or phase controllers, on different or both paths, in order to implement the described phase differences.

Aspects of the disclosure provide for any combination of a transmitter, receiver or system comprising a transmitter, receiver and/or optical transmission medium (optical fiber). Any aspect may be applicable to any example, in any combination.

Although the aspects have been described with reference to a signal comprising both transverse magnetic polarization modes and transverse electric polarization modes, i.e. elliptically polarized signals, the polarization insensitivity of the device means that only one polarization mode will be output by the device regardless of whether the signals received from the fiber are all transversely electrically, transversely magnetically or elliptically polarized.

The invention claimed is:

1. A device for processing a signal, the device comprising:
a polarization module configured to:
   receive a multi-wavelength optical input signal comprising a plurality of wavelengths; and
   for each wavelength, convert a component of each wavelength having a first polarization mode into a converted component having a second, different, polarization mode; and
processing circuitry configured to:
   combine the converted component of each wavelength with a direct component of each wavelength received with the second polarization mode; and
   generate a multi-wavelength optical output signal solely having the second polarization mode;
wherein the processing circuitry comprises:
   a first optical phase shift module configured to apply a first phase shift to each wavelength of the converted component and/or direct component received from the polarization module; and
   a first optical coupler configured to receive the converted component and direct component, at least one of the converted component and direct component being phase shifted by the first phase shift; and
wherein the first optical phase shift module is configured to apply the first phase shift such that the first optical coupler outputs a first and second optical signal of substantially equal power.

2. The device of claim 1, wherein the device is configured to receive the multi-wavelength optical input signal in which each wavelength has substantially the same state of polarization.

3. The device of claim 1:
wherein the processing circuitry comprises:
a second optical phase shift module configured to apply a second phase shift to each wavelength of the first and/or second optical signal received from the first optical coupler; and
a second optical coupler configured to receive the first and/or second optical signal, at least one of the first and/or second optical signal being phase shifted by the second phase shift; and
wherein the second optical phase shift module is configured to apply the phase shift such that the coupler outputs a combined multi-wavelength optical signal solely having the second polarization mode.

4. The device of claim 3, wherein the first and/or second optical phase shift modules are controlled to vary the respective first and/or second phase shift.

5. The device of claim 4, wherein the device comprises a measurement unit configured to detect an optical power within the device, and control the first and/or second phase shift modules based on the detected optical power.

6. An optical communication system, comprising:
a transmitter configured to transmit a multi-wavelength optical signal comprising a plurality of wavelengths along an optical fiber;
a receiver comprising a device for processing a signal, the device comprising:
a polarization module configured to:
receive the multi-wavelength optical signal comprising the plurality of wavelengths; and
for each wavelength, convert a component of each wavelength having a first polarization mode into a converted component having a second, different, polarization mode; and
processing circuitry configured to:
combine the converted component of each wavelength with a direct component of each wavelength received with the second polarization mode; and
generate a multi-wavelength optical output signal solely having the second polarization mode;
wherein the transmitter is configured to transmit wavelengths which are selected to be within a determined bandwidth; and
wherein the bandwidth is determined such that the polarization modes of the wavelengths within the bandwidth have a variation which is substantially uniform among the wavelengths.

7. The system of claim 6, wherein the transmitter comprises:
a generator unit configured to generate the plurality of wavelengths; and
a multiplexer unit configured to multiplex the plurality of wavelengths;
wherein the multiplexer unit is configured to maintain a polarization of each wavelength.

8. The system of claim 6, wherein the determined bandwidth is based on an average differential group delay of the optical fiber, and/or based on a phase modulation dispersion coefficient of the optical fiber and a length of the fiber.

9. The system of claim 6, wherein the determined bandwidth is defined by:

$$\Delta\lambda = 1/\langle\Delta_T\rangle$$

where $\Delta\lambda$ is the determined bandwidth in units of nanometers, and $\langle\Delta_T\rangle$ is the average differential group delay in units of picoseconds.

10. The system of claim 9, wherein $$\langle\Delta_T\rangle = \text{PMD coeff.} \times L^{1/2}$$

where PMD coeff. is a coefficient indicating the phase modulation dispersion of the fiber in units of $ps/km^{1/2}$, and L is the length of the fiber between the transmitter and receiver in units of kilometers.

11. A method for processing a signal, the method comprising:
receiving a multi-wavelength optical input signal comprising a plurality of wavelengths;
for each wavelength, converting a component of each wavelength having a first polarization mode into a converted component having a second, different, polarization mode; and
combining the converted component of each wavelength with a direct component of each wavelength received with the second polarization mode; and
generating a multi-wavelength optical output signal solely having the second polarization mode;
applying a first phase shift to each wavelength of the converted component and/or direct component received from the polarization module; and
coupling the received the converted component and direct component, at least one of the converted component and direct component being phase shifted by the first phase shift;
wherein the first phase shift applied is such that the coupling outputs a first and second optical signal of substantially equal power.

12. The method of claim 11, further comprising receiving the multi-wavelength optical input signal in which each wavelength has substantially the same state of polarization.

13. The method of claim 11, further comprising controlling the first phase shift.

14. An optical communication method, comprising:
transmitting a multi-wavelength optical signal comprising a plurality of wavelengths along an optical fiber; and
receiving the multi-wavelength optical signal comprising the plurality of wavelengths;
for each wavelength, converting a component of each wavelength having a first polarization mode into a converted component having a second, different, polarization mode; and
combining the converted component of each wavelength with a direct component of each wavelength received with the second polarization mode; and
generating a multi-wavelength optical output signal solely having the second polarization mode;
wherein the transmitting comprises transmitting wavelengths which are selected to be within a determined bandwidth; and
wherein the bandwidth is determined such that the polarization modes of the wavelengths within the bandwidth have a variation which is substantially uniform among the wavelengths.

15. The method of claim 14, wherein the transmitting comprises:
generating the plurality of wavelengths; and
multiplexing the plurality of wavelengths, wherein the multiplexing comprises maintaining a polarization of each wavelength.

16. The method of claim 14, wherein the determined bandwidth is based on an average differential group delay of the optical fiber, and/or based on a phase modulation dispersion coefficient of the optical fiber and a length of the fiber.

\* \* \* \* \*